United States Patent [19]

Biard et al.

[11] 4,400,054
[45] Aug. 23, 1983

[54] PASSIVE OPTICAL COUPLER

[75] Inventors: James R. Biard; John E. Shaunfield, both of Richardson; Royce S. Speer, Wylie, all of Tex.

[73] Assignee: Spectronics, Inc., Richardson, Tex.

[21] Appl. No.: 341,873

[22] Filed: Jan. 22, 1982

Related U.S. Application Data

[63] Continuation of Ser. No. 949,861, Oct. 10, 1978, abandoned, which is a continuation of Ser. No. 707,428, Jul. 21, 1976, abandoned.

[51] Int. Cl.$^3$ .............................................. G02B 5/172
[52] U.S. Cl. .................. 350/96.15; 350/96.19; 350/286
[58] Field of Search ............... 350/96.15, 96.16, 96.25, 350/286, 96.19

[56] References Cited

U.S. PATENT DOCUMENTS

| | | | |
|---|---|---|---|
| 2,825,260 | 3/1958 | O'Brien | 350/96.25 |
| 2,946,253 | 7/1960 | Clark, Jr. | 350/96.10 |
| 3,398,288 | 8/1968 | Sanders et al. | 350/96.19 X |
| 3,625,587 | 12/1971 | Harrick | 350/286 X |
| 3,870,396 | 3/1975 | Racki et al. | 350/96.16 |
| 3,870,398 | 3/1975 | Love | 350/96.16 |
| 3,874,779 | 4/1975 | Thiel | 350/96.16 |
| 3,883,217 | 5/1975 | Love et al. | 350/96.16 |
| 3,901,582 | 8/1975 | Milton | 350/96.16 |
| 4,087,159 | 5/1978 | Ulrich | 350/96.16 |

OTHER PUBLICATIONS

Cooper, "Coupler for Optical Data," *IBM Tech. Discl. Bulletin*, vol. 16, No. 5, Oct. 1973, pp. 1470-1471.
Chen et al., *Applied Optics*, vol. 2, No. 3, Mar. 1963, pp. 265-271.

*Primary Examiner*—John D. Lee
*Attorney, Agent, or Firm*—Kanz & Timmons

[57] ABSTRACT

Disclosed is an optical data bus employing a passive optical coupler. The optical coupler includes a scrambler rod which is rectangular in cross section and employs solid substantially inflexible side arms which are also rectangular in cross section. The side arms include a mirrored prism to bend the light path and permit separation of the ends of the distribution side arms so that flexible fiber bundles may be attached to the ends of the distribution side arms.

27 Claims, 5 Drawing Figures

PASSIVE OPTICAL COUPLER

This is a continuation of application Ser. No. 949,861 filed Oct. 10, 1978, now abandoned, which is a continuation of application Ser. No. 707,428 filed July 21, 1976, now abandoned.

This invention relates to optical couplers. More particularly, it relates to multi-terminal couplers for optical data busses and the like.

Optical data busses have found application in various fields, particularly avionics, because of many unique characteristics. For example, optical busses are very light, extremely reliable and are immune to external radiation and magnetic fields. Typically a data bus system includes a plurality of stations, each station including a signal generating device and a signal responsive device. The stations are interconnected by a signal carrying bus. Signal coupling devices are required in an optoelectronic data bus so that each station can receive signals from the bus and transmit signals onto the bus. By this means every station on the bus can communicate with every other station on the bus.

In avionic systems, reliability considerations normally exclude the use of repeaters in an optoelectronic data bus. Accordingly, low-loss passive optical couplers are a basic requirement for useful optical data bus systems. The signal attenuation of the bus itself is determined by the design of the bus and the distance between stations. One major source of signal loss occurs at the interfaces between the station and the bus and the coupler and the bus.

The bus is usually a flexible bundle of fibers of circular cross section. The ends of the fiber bundles are terminated in rectangular, hexagonal or circular cross section to optimize packing density. However, for bundles containing large numbers of fibers, losses occur at the interfaces between the opposing end faces of two fiber bundles since the end of each fiber in one bundle cannot be axially aligned with the end of another fiber in the other bundle. Thus, transmission efficiency is lost at the interface. Likewise, the interface between the end of a bundle of fibers and the end of a scrambler rod causes energy losses since the circular cross section fibers do not completely cover the end cross section surface of the scrambler rod. This is commonly referred to as packing fraction loss. This same loss occurs at interfaces between the ends of two fiber bundles and at the interface between the transmitting (or LED) station and the bus.

Another major cause of poor system efficiency is the use of circular cross section fiber bundles and circular cross section scrambler rods. Since the purpose of the scrambler rod is to uniformly distribute all incoming light from any input over the ends of all the arms of the coupler, any design which does not optimize uniform distribution causes inefficiency in the overall system. However, scramblers of the conventional circular cross section design suffer from an inherent defect. Off-axis light introduced at the edge of the scrambler strikes the clad surface of the scrambler at a small angle. The small angle rays, known as skew rays, traverse the length of the scrambler rod by a series of small angle reflections which always keep the ray near the edge. Thus off-axis light introduced into a scrambler of circular cross section will not be uniformly distributed by the scrambler. The concentration of skew rays near the edge results in an non-uniform power distribution with the highest power density at the edge of the rod and the lowest power density at the center.

In accordance with the invention, a coupler is provided which uses a scrambler rod of rectangular cross section and solid side arms also of rectangular cross section to couple the scrambler rod to the flexible fiber bundles of the bus. The four orthogonal faces of the rectangular rod act as plane mirrors. Thus each point of the exit surface of the scrambler rod sees the imput fiber and eight visual images for all positions of the imput fiber. Therefore off-axis rays from each input fiber are uniformly distributed over the exit face of the scrambler and skew rays are completely eliminated. Furthermore, since the side arms are also solid bodies of rectangular cross section, packing fraction losses at the side arm-scrambler interface are virtually eliminated.

Thus the coupler of the invention eliminates one major source of inefficiency in optical data bus systems and reduces another by eliminating some of the packing fraction losses. Other features and advantages of the invention will become more readily understood from the following detailed description taken in connection with the appended claims and attached drawings in which:

Optical data bus systems may take various forms. For example, there are in-line systems wherein each station communicates with a data bus. The in-line system can be either open-ended or in a closed loop. Such systems may be simplex systems with data transmission in only one direction. Alternatively, such systems may be designed as half-duplex systems in which data transmission is in both directions. Passive couplers may be designed for optimum coupling at each station to optimize the received signal.

In-line systems require the use of T couplers. In this type of coupler at least one packing fraction loss is encountered at each station. This multiplies the lossy interfaces which the signal must cross.

In an $\eta$ station data bus, a signal transmission from station 1 to station $\eta$ will encounter $\eta$-1 lossy interfaces. To eliminate some of the lossy interfaces associated with in-line systems, radial systems have been designed. A radial data bus only requires one passive coupler. That coupler need not be located at any one of the stations.

In a radial system each station is connected directly to the coupler. Thus each signal path encounters no more than two lossy interfaces regardless of the number of stations on the bus. Therefore, although the total length of the flexible fiber bundles associated with a radial system may be longer than the total length of an in-line data bus, the reduction in number of lossy interfaces more than compensates for transmission losses due to longer transmission lengths sometimes involved in radial systems. Furthermore, the system may be designed to position the coupler at an optimum distance from each station and compensation can be made at each station to balance signal receiving and transmitting efficiency.

The present invention will be described with particular reference to a radial half-duplex data bus system. It will be understood, however, that the invention, considered in its broadest sense, is not so limited.

Figure 1:
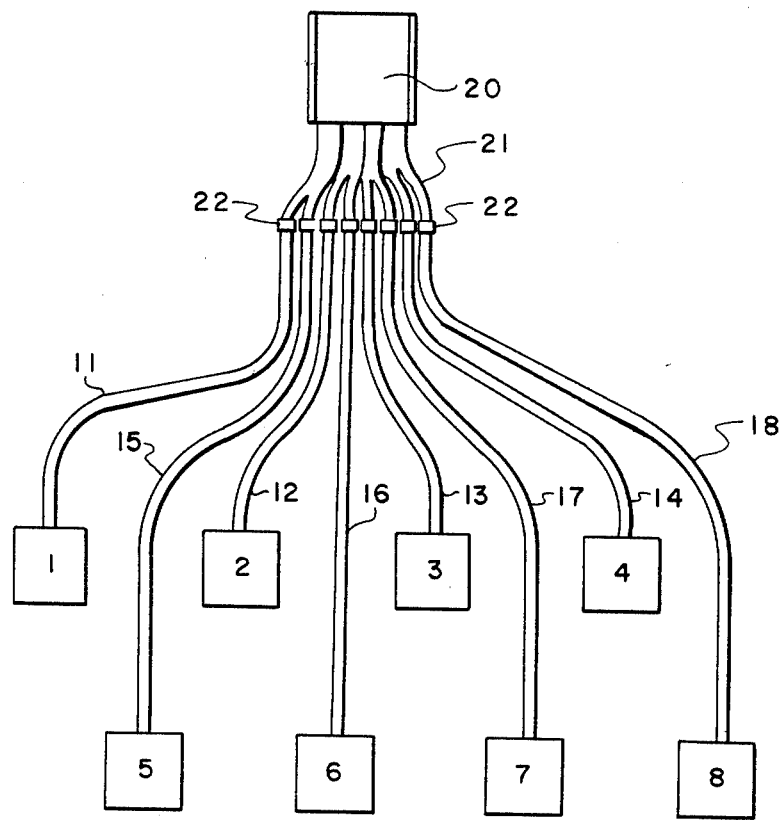
FIG. 1 is a schematic illustration of a radial duplex data bus system.

The general configuration of an optical radial half-duplex data bus is schematically illustrated in FIG. 1. The data bus comprises a plurality of flexible fiber bundles 11-18, each having one end connected to a remote station 1-8 and the other end connected to a coupler. The coupler comprises a scrambler rod 20, the optical output face of which is optically coupled with one end of each of the fiber bundles 11-18 through side arms 21. Preferably the side arms 21 are removably coupled to the ends of the fiber bundles 11-18 through a pluggable type interface 22.

In an optical radial half-duplex data bus system each station 1-8 comprises a pair of optoelectronic devices, one for receiving optical signals from the fiber bundle and one for transmitting optical signals onto the fiber bundle. Both optoelectronic devices are in optical communication with the end of the fiber bundle. Each fiber bundle 11-18 comprises a length of flexible optical fibers, such as glass fibers or the like, well known for their properties of total internal reflection and commonly used for transmitting optical signals.

As illustrated in FIG. 1 the radial data bus connects all stations to a centrally located mixing point. Thus, one passive coupler is used to couple all of the fiber bundles. The coupler comprises a scrambler rod 20 with eight side arms 21.

The purpose of a scrambler in a passive coupler is to accept optical energy from a number of input sources and spread it as uniformly as possible over the area of the scrambler output surface without altering the axial angular distribution of the light. This function is performed by an optically smooth glass rod which is mirrored on all external surfaces except the input and output ends. The mirror on the exterior surface of the scrambler rod 20 should be provided by total internal reflection. The total internal reflection phenomenon produces a 100% reflective mirror while a metal mirror reflects only about 97-98% of the incident light. Total internal reflection can be achieved using ordinary optical quality glass rod having a high index of refraction which is polished to the desired dimensions and then clad with a material having a lower index of refraction than that of the glass.

Many cladding materials are available and commonly used for this purpose, such as a low index silicone or epoxy resin. In practice, the plastic cladding material may also serve as the medium for mounting the scrambler rod in its supporting housing.

In a T coupler the ends of the scrambler rod are not mirrored; thus the scrambler rod functions much as a transmission fiber. In a radial coupler one end of the scrambler rod is mirrored so that all light entering the input/output face is reflected back out the same input/output face.

The mirror over the end of the scrambler opposite the input/output face is ideally a multi-layered dielectric coating similar to that used in laser mirrors. The design and fabrication of the scrambler rod as used herein (except for the shape) is well known and may be accomplished by conventional techniques. Accordingly, detailed discussion of the optical characteristics of the scrambler rod which are not critical to the unique design of the invention will not be discussed in detail herein.

The length and diameter of the scrambler rod are parameters which are dictated by system design. The scrambler must be long enough so that light exiting any individual fiber at the input surface spreads out to fill the entire exit surface. Ideally, the scrambler rod should be short enough that no meridional ray reflects from the clad surface more than one time. The cross sectional area of the scrambler rod must be equal to the composite surface area of the side arms.

Prior radial optical data bus couplers have been fabricated using a scrambler rod of circular cross section. Scrambler rods of circular cross section are generally used because of the convenience of fabricating and aligning circular cross sections. It will be observed, however, that each fiber within the bundle is also of circular cross section. As a result, even when the fibers are tightly packed within the circular cross sectional area of the input/output face of the scrambler rod, the output from the scrambler rod is significantly attenuated by the packing fraction loss at the interface between the output face of the scrambler rod and the ends of the fiber bundles. Furthermore, as pointed out above, even though the purpose of the scrambler rod is to evenly distribute the input from a single input fiber to the entire output surface of the scrambler rod, skew rays entering the scrambler rod at a small angle may be concentrated near the edge of a circular scrambler rod preventing even distribution of the output density of the scrambler rod.

As illustrated in FIG. 1, each of the fiber bundles 11-18 are normally and preferably detachably connected to the coupler side arms by means of a plug connection 22. Consequently, a lossy interface exists at each connector interface 22. Since the fiber bundles 11-18 each comprise a bundle of fibers and the coupler side arms 21 likewise comprise bundles of fibers, direct axial alignment between fibers in adjacent faces is highly unlikely. Accordingly, because of packing fraction losses and the like, signal attenuation occurs at the connector interface 22. More importantly, since the signal must cross the connector interface 22 in both directions, signal attenuation at this point is doubled.

In accordance with the invention, uneven distribution in the scrambler rod is totally eliminated and packing fraction loss at several of the interfaces is reduced or eliminated by use of a scrambler rod which is rectangular in cross section and solid one piece side arms which are likewise rectangular in cross section.

A radial half-duplex optical data bus coupler employing the principles of the invention is illustrated in FIGS. 2-5. The coupler comprises a scrambler rod 20 mounted within a housing 23. The scrambler rod 20 is rectangular in the plane normal to its longitudinal axis. The sides of the scrambler rod 20 are clad with a material 24 having a lower index of refraction than the scrambler rod to provide total internal reflection. The open end 20a is preferably covered with a multi-layered dielectric coating to produce a highly reflective mirror.

Figure 4:
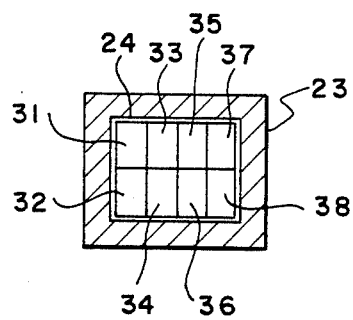
FIG. 4 is a sectional view of the coupler of FIG. 3 taken along section lines 4—4.

In the embodiment illustrated, eight side arms 31-38 are employed. The side arms 31-38 however, like the scrambler rod, are solid bodies rectangular in cross section as illustrated in FIG. 4. The side arms 31-38 are arranged parallel with one end of each rod terminating in a common plane which is parallel and adjacent the output face 20b of the scrambler rod 20.

Figure 2:
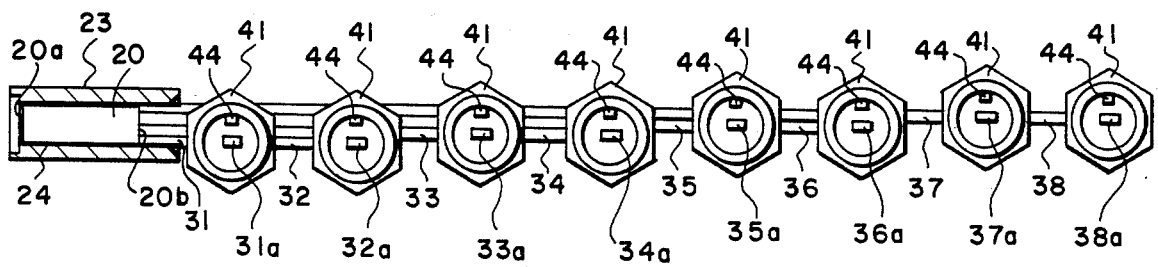
FIG. 2 is a top plan view of an eight arm radial coupler illustrating one embodiment of the invention.
Figure 3:
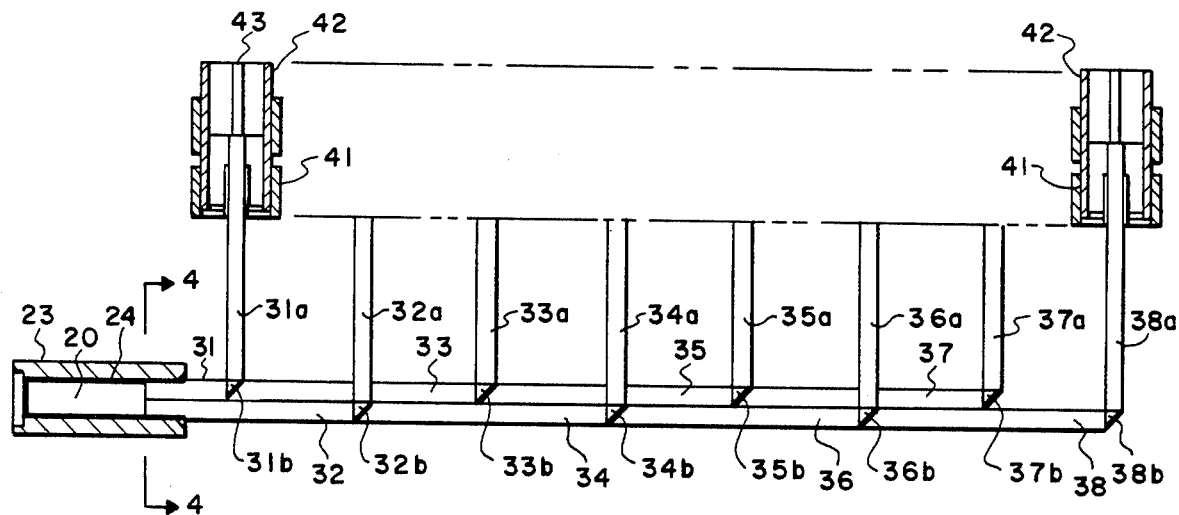
FIG. 3 is a side view of the coupler of FIG. 2 illustrating the arrangement of distribution side arms.

In the preferred embodiment each side arm 31-38 is a solid substantially inflexible elongated body of material such as ordinary optical quality glass with its sides coated with a cladding of a material having a lower index of refraction than that of the side arm body. Each side arm body is thus uniform and unitary in cross section and has a single straight line longitudinal axis which is parallel to the axis of the scrambler rod over the full length of the side arm body as illustrated in FIGS. 2 and 3. As a practical matter, the side arms 31-38 and the scrambler rod 20 are usually made from the same material and the cladding 24 used to clad the scrambler rod 20 is the same material used to clad the side arms.

The ends of the side arms, as described above, may be positioned adjacent the input/output face 20b of the scrambler rod and clad with the cladding material simultaneously. In the preferred embodiment the cladding material is used to mount and support the side arms within a housing and parallel to each other. The side arms are positioned as close together as possible to minimize packing fraction losses. Since the side arm bodies are rectangular in cross section and relatively large, as compared to flexible fibers, the packing fraction loss at the side arm-scrambler interface is greatly reduced.

As illustrated in FIGS. 2, 3 and 4, the side arm rods are of varying length but one end of each rod terminates in a common plane parallel with the input/output face 20b of the scrambler rod 20. The side arms 31-38 are arranged so that the total area defined by the end faces of all the arms is approximately coincident with the surface area of the input/output face 20b of the scrambler rod 20. Ideally, the end faces of the arms would be optically coupled to the input/output face of the scrambler rod 20 with a material having the same index of refraction as the scrambler rod and side arms. As a practical matter, however, such a coupling medium is not available. Therefore, the ends of the coupling arms are clad with the same cladding material with which the other external surfaces are clad. The ends of the side arms, like the input/output face 20b of scrambler rod 20, are flat and normal to the longitudinal axes of the glass bodies. Therefore, light rays propagated through the side arms which strike the interface between the input-/output face 20b of the scrambler rod 20 and the side arms at angles less than the critical angle are propagated directly through the interface and into the scrambler rod. Likewise, rays reflected out of the scrambler rod are propagated directly through the interface into the side arms.

It should be observed that since the side arms are solid bodies of rectangular dimensions, they may be fitted closely together with the only space lost between the arms being the space occupied by the cladding material on the external surfaces of the side arms. It will also be observed that since the side arms are rectangular in cross section they may be formed of dimensions so that the total surface area of the end faces of the combined side arms is equal to the total surface area of the input/output face 20b of the scrambler rod 20 and the external boundary of the combined end faces of the side arms is coincident with the dimensions of the input/output face 20b of the scrambler rod. Accordingly, the packing fraction loss at the scrambler rod/side arm interface is reduced to that portion of the area occupied by the cladding material between the adjacent side arms.

From the foregoing it will be observed that an optical signal transmitted through any side arm 31-38 by internal reflection is propagated directly through the interface into the scrambler rod 20. The optical energy entering scrambler rod 20 is reflected back through the input/output face 20b of the scrambler rod and uniformly distributed across the end faces of all the side arms. Thus, a signal entering the scrambler rod 20 from any side arm is propagated out of the scrambler 20 into all of the side arms, the only loss being the packing fraction loss. The packing fraction loss, however, is reduced to that small area occupied by the material cladding the external surfaces of the parallel and relatively large side arms bodies with closely fitted parallel flat sides adjacent each other.

Optical signals traverse the length of each side arm 31-38 by total internal reflection. Through the phenomenon known as total internal reflection, light entering one end of a light pipe is propagated through the pipe and exits the opposite end of the pipe at the same angle at which it entered. Since the side arms 31-38 are clad with a material which has a lower index of refraction than the material of the arm, each light ray striking the surface of the arm at an angle greater than the critical angle is reflected and thus propagated through the arm. The large solid arms of the invention, however, cannot be readily bent. Therefore, the ends of the arms cannot be separated to permit direct interconnection with flexible fiber bundles.

Figure 5:
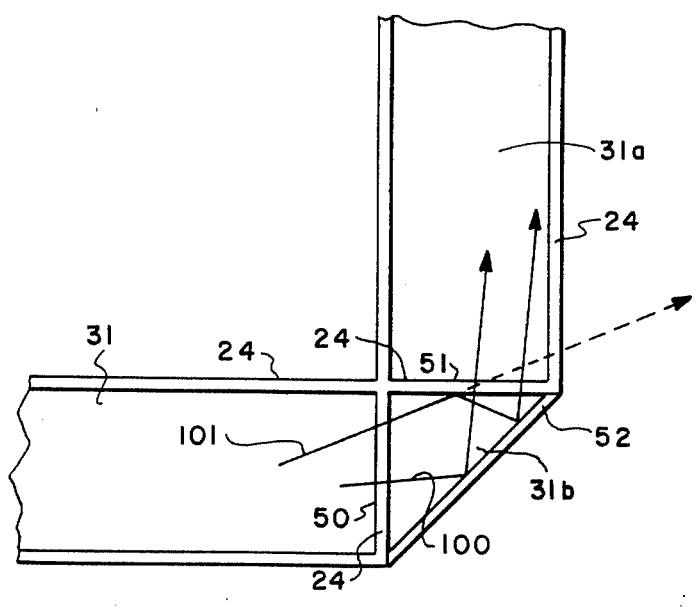
FIG. 5 is a diagrammatic illustration of the corner optics shown in FIG. 3 for use in interconnecting the distribution side arms of the radial coupler with the scrambler rod to assure conservation of angles.

To permit separation of the ends of the side arms and allow interconnection thereof with flexible fiber bundles, the side arms are of different lengths and one end of each side arm 31-38 is connected to a distribution side arm 31a-38a, respectively. As illustrated in FIGS. 3 and 5 each side arm 31-38 is coupled to a distribution side arm 31a-38a, respectively, through a 90° prism 31b-38b, respectively. Each prism 31b-38b is a body of the same material as the side arms. The length of the prism is the same as the width of the side arms. The relationship of the corner optics is shown in detail in FIG. 5. In conventional terminology, the optical conduit formed by the three interconnected parts, 31, 31a and 31b, is functionally equivalent to a flexible bundle side arm in a conventional raidal coupler. Since the side arm is formed of three solid inflexible parts in the present invention, the portion of the side arm abutting the scrambler rod will be referred to as a side arm and the portion of the arm which is connected to the fiber bundle referred to as a distribution side arm.

As illustrated in FIG. 5, the end 50 of the side arm 31 terminates in a flat surface normal to the axis of the arm 31. Likewise, the end of the distribution arm 31a terminates in a flat surface 51 normal to the axis of the arm 31a. The axis of side arm 31 is 90° from the axis of distribution side arm 31a and the arms are positioned so that the ends 50 and 51 form the sides of a right triangle. All surfaces of the arms 31 and 31a are clad with a material 24 having a lower index of refraction than the material of the arms as described above.

The prism 31b has a mirror 52 formed on the side opposite the right angle. The mirror is preferrable formed of dielectric material as described hereinabove with respect to the open end 20a of the scrambler rod 20 but may also be formed by metalizing. The prism 31b is positioned adjacent the ends 50 and 51 of the side arms so that the mirrored side 52 lies at an angle of 45° to the axes of the arms 31 and 31a. The mirrored prism 31b thus provides means for turning the optical path 90°. It should be observed that both interfaces between the prism and the ends 50 and 51 of the side arms are clad to provide conservation of angles in both directions. A ray of light 100 propagated through side arm 31 toward the prism 31b strikes the end face 50 at an angle less than the critical angle and thus is transmitted across the interface, strikes the mirror 52 and is reflected toward the end face 51. The ray also strikes this interface at an angle less than the critical angle and thus is transmitted across this interface and into the connecting side arm 31a at the same angle with respect to the axis thereof at which it exited side arm 31. The ray will thus continue to be propagated through distribution side arm 31a by total internal reflection. It should be noted that a ray of light 101 propagated through side arm 31 may strike the end face 50 at an angle less than the critical angle (and thus be transmitted across the interface) but strike the end face 51 at an angle greater than the critical angle. If prism 31b were simply an extension of distribution arm 31a, or if the interface between end face 51 and the prism was not a coated interface to provide total internal reflection, the ray would proceed directly to the side of distribution arm 31a and strike this face at an angle less than the critical angle, thus would be coupled out of the system as shown by the dashed line. However, since the face of the prism adjacent face 51 is clad with a material of lower index of refraction and the ray 101 strikes this surface at an angle greater than the critical angle, ray 101 is reflected toward mirrored surface 52. This ray is then reflected back toward the end face 51 at an angle less than the critical angle, thus is transmitted across the interface and into distribution arm 31a. The ray 101 is therefore transmitted into the distribution arm 31a at an angle which is greater than the critical angle (with respect to the sides) and thus is propagated through the arm 31a by total internal reflection.

Light rays traveling in the opposite direction are likewise turned 90° while maintaining conservation of angles. The only loss which can occur at the corner, therefore, is any loss attributable to absorbtion in the mirror surface 52 or reflection by the cladding at the interface which is negligible. It should also be observed that the cladding material is the same material used for mounting the parts, thus the cladding is very thin and advantageously aids in positioning the parts during assembly.

Using the corner optics as described with reference to FIG. 5 each side arm 31-38 can be turned 90° and, by using side arms 31-38 of staggered lengths, the ends of the distribution side arms 31a-38a may be spaced apart as illustrated in FIGS. 2 and 3. The end of each distribution side arm 31a-38a is preferrably encased in a ferrule connector housing 41 which mates with a mating connector 42 carrying the end of a flexible bundle of fibers 43.

In the embodiment illustrated eight arms are shown. Since the scrambler rod 20 is rectangular, the side arms 31-38 and 31a-38a are also rectangular. The end of the flexible bundle 43 should thus be rectangular in cross section to match the dimensions of the end face of the distribution side arms 31a-38a. The connector ferrule 41 is thus provided with an indexing slot 44 which mates with an indexing pin in the connector for the flexible fiber bundle. Since the mating ends are rectangular in shape, the ends must be geometrically matched to avoid signal loss through mis-orientation.

Since the scrambler rod and side arms are all solid pieces of ordinary optical quality glass, it is preferred that the entire coupler assembly be encased and rigidly mounted in a rigid housing (not shown). As discussed above, the critical requirement of the cladding material is that it have a lower index of refraction than the optical parts. Various materials are suitable for this purpose which also exhibit desirable temperature stability and bending characteristics so that they may be used to mount the optical parts within the housing. A typical material found suitable for this purpose is a silicone resin sold by Dow Corning under the trade designation Dow Corning Sylgard 184. Other materials will be readily apparent to those skilled in the art. For example, the glass parts could be coated with an evaporated layer of MgF and then glued together with any suitable adhesive.

Although the invention has been described in detail with reference to an eight arm coupler, it will be apparent that the number of side arms and shape of the scrambler rod and side arms are not limited to this configuration. For example, a square scrambler rod could be used with nine square side arms arranged in a three by three array. Other arrangements of rectangular or square scrambler rods and side arms will become readily apparent to those skilled in the art.

When solid side arms are used, there is no packing fraction loss at the interface between the side arm and the transmitting fiber bundle. However, a packing fraction loss is encountered at the interface between the side arm and the receiving fiber bundle. Thus, with solid arm construction in a radial arm coupler, only one packing fraction loss is encountered in each signal flow path.

When solid side arms having square cross section are used, the fiber bundle termination may be circular in cross section. When the circular bundle termination fits inside the square side arm face, there is no packing fraction loss at the interface between the side arm and the transmitting fiber bundle. However, the packing fraction loss and an additional loss in transmission of $1 - \pi/4$ is encountered at the interface between the side arm and the receiving fiber bundle. Since a circular termination is not sensitive to rotation, this configuration eliminates the need for keying the fiber bundle ferrule to the side arm with only a small increase in transmission loss.

From the foregoing it will be observed that a passive optical coupler for a data bus formed using a rectangular scrambler rod and rectangular solid side arms eliminates non-uniform energy distribution due to skew rays. Furthermore, packing fraction losses are greatly reduced and signal attenuation is greatly reduced.

It is to be understood that although the invention has been described with particular reference to specific embodiments thereof, the forms of the invention shown and described in detail are to be taken as preferred embodiments of same, and that various changes and modifications may be resorted to without departing from the spirit and scope of the invention as defined by the appended claims.

What is claimed:

1. An optical coupler including a scrambler rod comprising a body having rectangular dimensions in the plane normal to the longitudinal axis thereof and a plurality of substantially inflexible, solid, unitary, elongated side arms of rectangular dimensions in the plane normal to the longitudinal axes thereof positioned and rigidly affixed adjacent each other with the input end faces of all said side arms in a common plane parallel with the output face of said scrambler rod and optically coupled to the output face of said scrambler rod and the longitudinal axis of each of said side arms in a single plane parallel with the longitudinal axes of the other side arms and parallel with the longitudinal axis of said scrambler rod, the total surface area of said end faces in said common plane being substantially equivalent to the surface area of said output face.

2. An optical coupler as defined in claim 1 wherein the sides of said scrambler rod and said side arms and the opposed faces of said scrambler rod and said side arms are coated with a material having an index of refraction lower than the index of refraction of said scrambler rod and said side arms.

3. An optical coupler including a scrambler rod comprising a body having rectangular dimensions in the plane normal to the longitudinal axis thereof and a plurality of substantially inflexible, solid, unitary, elongated side arms of rectangular dimensions in the plane normal to the longitudinal axes thereof positioned and rigidly affixed adjacent each other with the input end faces of all said side arms in a common plane parallel with the output face of said scrambler rod and optically coupled to the output face of said scrambler rod and the longitudinal axis of each of said side arms in a single plane parallel with the longitudinal axes of the other side arms and parallel with the longitudinal axis of said scrambler rod, the total surface area of said end faces in said common plane being substantially equivalent to the surface area of said output face and the boundary of the end faces lying in said common plane being coincident with the boundary of said output face.

4. An optical coupler comprising:
(a) a scrambler rod comprising a solid elongated body having rectangular dimensions in the plane normal to its longitudinal axis and having a coating on the sides thereof having an index of refraction lower than the index of refraction of said body; and
(b) a plurality of side arms, each side arm including a first solid body elongated in a single longitudinal axis and having rectangular dimensions in the plane normal to its longitudinal axis, each of said first elongated bodies arranged parallel with the axis of said scrambler rod and having one end lying in a common plane parallel with the output face of said scrambler rod, at least one of said side arms including a second solid body elongated in a single longitudinal axis and having cross-sectional dimensions substantially the same as said first elongated body and arranged with its longitudinal axis substantially 90° to the axis of said first elongated body, one end face of said first elongated body and one end face of said second elongated body defining an angle of 90°, and a 90° prism mounted within the angle defined by said end faces with one face of said prism adjacent each of said end faces and a mirror adjacent the third face of said prism lying in a plane 45° from the axes of said first and second elongated bodies.

5. An optical coupler as defined in claim 4 wherein said mirror is a dielectric coating.

6. An optical coupler as defined in claim 4 wherein said scrambler rod and said side arms have substantially the same index of refraction.

7. An optical coupler as defined in claim 4 wherein the spaces between the faces of said prism and the adjacent faces of said first and second elongated bodies are filled with a material having an index of refraction lower than the index of refraction of said first and second elongated bodies.

8. An optical coupler as defined in claim 4 including means for coupling a flexible optical fiber bundle to the end of each of said side arms remote from said scrambler rod.

9. Optical conduit means comprising:
(a) a first body elongated in a single directional longitudinal axis and having rectangular dimensions in the plane normal to said longitudinal axis and also having at least one end thereof terminating in an end face normal to the longitudinal axis of said first elongated body;
(b) a second body elongated in a single directional longitudinal axis and having rectangular dimensions in the plane normal to said longitudinal axis and also having at least one end thereof terminating in an end face normal to the longitudinal axis of said second elongated body, said second elongated body positioned with its longitudinal axis 90° from the longitudinal axis of said first elongated body and said end faces forming an angle of 90°;
(c) a prism having first and second sides forming an angle of 90° and connected by a third side, said first side of said prism positioned parallel with said at least one end face of said first elongated body, said second side of said prism positioned parallel with said at least one end face of said second elongated body, and said third side lying in a plane 45° from the longitudinal axes of said first and second elongated bodies;
(d) a mirror on said third side of said prism; and
(e) a cladding material on said end faces of said elongated bodies and on said first and second sides of said prism, said cladding material having an index of refraction lower than the indices of refraction of said elongated bodies and said prism.

10. Optical conduit means as defined in claim 9 wherein said first elongated body, said second elongated body and said prism have approximately the same index of refraction.

11. Optical conduit means as defined in claim 9 wherein said cladding material between said end faces of said elongated bodies and the opposed faces of said prism has an index of refraction lower than the index of refraction of said elongated bodies and said prism and bonds said prism to said end faces.

12. Optical conduit means as defined in claim 9 wherein said elongated bodies and said prism have substantially the same index of refraction and all sides of said elongated bodies and said prism are coated with a material having a lower index of refraction.

13. Optical conduit means comprising:
(a) a first elongated body having rectangular dimensions in the plane normal to its longitudinal axis and having at least one end thereof terminating in an end face normal to the longitudinal axis of said first elongated body;
(b) a second elongated body having rectangular dimensions in the plane normal to its longitudinal axis and having at least one end thereof terminating in an end face normal to the longitudinal axis of said second elongated body, said second elongated body positioned with its longitudinal axis 90° from the longitudinal axis of said first elongated body and said end faces forming an angle of 90°;

(c) a prism having first and second sides forming an angle of 90° and connected by a third side, said first side of said prism positioned parallel with said at least one end face of said first elongated body, said second side of said prism positioned parallel with said at least one end face of said second elongated body, and said third side lying in plane 45° from the longitudinal axes of said first and second elongated bodies;

(d) a mirror on said third side of said prism; and (e) a cladding material on said end faces of said elongated bodies and on said first and second sides of said prism, said cladding material having an index of refraction lower than the indices of refraction of said elongated bodies and said prism.

14. Optical conduit means comprising:

(a) a solid, unitary body having a first input/output face lying in a first plane, a second input/output face lying in a second plane intersecting said first plane, first and second spaced apart side faces lying in parallel planes normal to said first and second planes, and a reflecting face lying in a plane normal to said parallel planes and intersecting said first plane and said second plane at equal angles;

(b) a relatively thin layer of cladding material on said first input/output face, said second input/output face and first and second side faces, said cladding material having an index of refraction lower than the index of refraction of said solid, unitary body;

(c) a mirror on said reflecting face; and (d) first transmitting and receiving means comprising an elongated body having an index of refraction greater than the index of refraction of said cladding material and an input/output face parallel with and adjacent and optically coupled with said first input/output face of said solid, unitary body by said cladding material providing total internal reflection at the interface between said first input/output face and said first transmitting and receiving means whereby conservation of angles of light traveling in both directions across said interface is provided.

15. Optical conduit means as defined in claim 14 wherein the angle between said first plane and said second plane is 90° and the plane of said reflecting face intersects said first plane and said second plane at angles of 45°.

16. Optical conduit means as defined in claim 14 including second transmitting and receiving means optically coupled with said second input/output face.

17. Optical conduit means as defined in claim 16 wherein said second transmitting and receiving means is an elongated body having an input/output face parallel with and adjacent said second input/output face and having an index of refraction greater than the index of refraction of said cladding material.

18. Optical conduit means as defined in claim 17 wherein said first and second transmitting and receiving means comprise substantially inflexible, solid, unitary elongated bodies having rectangular dimensions in the plane normal to the longitudinal axes thereof, the longitudinal axis of said first transmitting and receiving means extending normal to the plane of said first input/output face and the longitudinal axis of said second transmitting and receiving means extending normal to the plane of said second input/output face.

19. Optical conduit means as defined in claim 18 wherein the angle between the longitudinal axes of said first and second elongated bodies is 90°.

20. Optical conduit means as defined in claim 17 wherein said first and second transmitting and receiving means are clad with a material having an index of refraction lower than the index of refraction of said transmitting and receiving means.

21. Optical conduit means comprising:

(a) a solid, unitary body having a first input/output face lying in a first plane, a second input/output face lying in a second plane intersecting said first plane, first and second spaced apart side faces lying in parallel planes normal to said first and second planes, and a reflecting face lying in a plane normal to said parallel planes and intersecting said first plane and said second plane at equal angles;

(b) a cladding material on said first input/output face, said second input/output face and first and second side faces, said cladding material having an index of refraction lower than the index of refraction of said solid, unitary body;

(c) a mirror on said reflecting face;

(d) first transmitting and receiving means having an index of refraction greater than the index of refraction of said cladding material and an input/output face parallel with said first input/output face and optically coupled with said first input/output face, said first transmitting and receiving means comprising a substantially inflexible, solid, unitary elongated body having rectangular dimensions in the plane normal to the longitudinal axis thereof with the longitudinal axis of said first transmitting and receiving means extending normal to the plane of said first input/output face; and (e) second transmitting and receiving means optically coupled with second input/output face.

22. Optical conduit means as defined in claim 21 wherein said second transmitting and receiving means has an index of refraction greater than the index of refraction of said cladding material and an input/output face parallel with said second input/output face and optically coupled with said second input/output face, said second transmitting and receiving means comprising a substantially inflexible, solid, unitary elongated body having rectangular dimensions in the plane normal to the longitudinal axis thereof with the longitudinal axis of said second transmitting and receiving means extending normal to the plane of said second input/output face.

23. Optical conduit means as defined in claim 22 wherein the angle between the longitudinal axes of said first and second elongated bodies is 90°.

24. Optical conduit means as defined in claim 21 wherein said first and second transmitting and receiving means are clad with a material having an index of refraction lower than the index of refraction of said transmitting and receiving means.

25. Optical conduit means as defined in claim 21 wherein any space between said first input/output face and the input/output face of said first transmitting and receiving means and any space between said second input/output face and the input/output face of said second transmitting and receiving means is filled with a material having an index of refraction lower than the index of refraction of said first and second transmitting and receiving means.

26. Optical conduit means comprising:

(a) a solid, unitary body having a first input/output face lying in a first plane, a second input/output face lying in a second plane intersecting said first plane, first and second spaced apart side faces lying in parallel plane normal to said first and second planes, and a reflecting face lying in a plane normal to said parallel planes and intersecting said first plane and said second plane at equal angles;

(b) a relatively thin layer of cladding material on said first input/output face, said second input/output face and first and second side faces, said cladding material having an index of refraction lower than the index of refraction of said solid, unitary body;

(c) a mirror on said reflecting face;

(d) first transmitting and receiving means comprising an elongated body having an index of refraction greater than the index of refraction of said cladding material and an input/ouput face parallel with and adjacent said first input/output face of said solid, unitary body; and (e) second transmitting and receiving means comprising an elongated body having an input/output face parallel with and adjacent said second input/output face and having an index of refraction greater than the index of refraction of said cladding material and optically coupled with said second input/output face, wherein said first and second transmitting and receiving means comprise substantially inflexible, solid, unitary elongated bodies having rectangular dimensions in the plane normal to the longitudinal axes thereof, the longitudinal axis of said first transmitting and receiving means extending normal to the plane of said first input/output face and the longitudinal axis of said second transmitting and receiving means extending normal to the plane of said second input/output face.

27. Optical conduit means as defined in claim 26 wherein the angle between the longitudinal axes of said first and second elongated bodies is 90°.

* * * * *

UNITED STATES PATENT AND TRADEMARK OFFICE
CERTIFICATE OF CORRECTION

PATENT NO. : 4,400,054
DATED : August 23, 1983
INVENTOR(S) : James R. Biard et al.

It is certified that error appears in the above-identified patent and that said Letters Patent are hereby corrected as shown below:

In Column 2, line 8, "of" should read ---on---

In Column 13, line 5, "plane" should read ---planes---

In Column 2, lines 9 and 10, "imput" should read ---input---

In Column 3, line 16, "Preferrably" should read ---Preferably---

In Column 4, line 34, "preferrably" should read ---preferably---

Signed and Sealed this

Twenty-seventh Day of December 1983

[SEAL]

Attest:

GERALD J. MOSSINGHOFF

Attesting Officer

Commissioner of Patents and Trademarks